US006658038B2

(12) United States Patent
Neumann et al.

(10) Patent No.: US 6,658,038 B2
(45) Date of Patent: Dec. 2, 2003

(54) SYSTEM FOR PRODUCING SINGLET DELTA OXYGEN LASER

(75) Inventors: David K. Neumann, Colorado Springs, CO (US); Thomas L. Henshaw, Monument, CO (US)

(73) Assignee: Neumann Information Systems, Inc., Colorado Springs, CO (US)

(*) Notice: Subject to any disclaimer, the term of this patent is extended or adjusted under 35 U.S.C. 154(b) by 0 days.

(21) Appl. No.: 10/198,594

(22) Filed: Jul. 18, 2002

(65) Prior Publication Data

US 2003/0035458 A1 Feb. 20, 2003

Related U.S. Application Data

(60) Provisional application No. 60/313,632, filed on Aug. 20, 2001.

(51) Int. Cl.[7] ............................................. H01S 3/095
(52) U.S. Cl. .......................... 372/89; 372/55; 372/34; 372/70
(58) Field of Search ............................. 372/89, 55, 34, 372/70

(56) References Cited

U.S. PATENT DOCUMENTS

| 4,267,526 A | * | 5/1981 | McDermott et al. ........... 372/89 |
| 4,975,265 A | | 12/1990 | Hed ............................. 423/579 |
| 2003/0035458 A1 | * | 2/2003 | Neumann et al. ............. 372/89 |

* cited by examiner

Primary Examiner—Leon Scott, Jr.
(74) Attorney, Agent, or Firm—Law Office of Dale B. Halling, LLC.

(57) ABSTRACT

A system for producing singlet delta oxygen has a source of liquid oxygen. A reactor has an input connected to the source of liquid oxygen. An optical pump is connected to an optical input of the reactor. The system can be by used as a laser by placing an optical resonator and a source of molecular iodine near the output of the reactor.

20 Claims, 5 Drawing Sheets

SYSTEM FOR PRODUCING SINGLET DELTA OXYGEN LASER

RELATED APPLICATIONS

This patent claims priority from the provisional patent application entitled "Optically Pumped Iodine Laser", filed on Aug. 20, 2001 and having application Ser. No. 60/313,632.

STATEMENT REGARDING FEDERALLY SPONSORED RESEARCH DEVELOPMENT

This invention was made with Government support under contract DAS60-0-C-0025 awarded by U.S. Army Space and Missile Defense Command. The Government has certain rights in the invention

FIELD OF THE INVENTION

The present invention relates generally to the field of devices for producing singlet delta oxygen and more particularly to a system for producing singlet delta oxygen and laser.

BACKGROUND OF THE INVENTION

Singlet delta oxygen has a number of uses in lasers, medicine, bio-decontamination and high temperature superconductors. One method of producing singlet delta oxygen in high percentages relative to ground state oxygen is a chemical generation process. This method is commonly associated with chemical lasers. Unfortunately, this method results in large weight and volume devices that consume large quantities of explosive and toxic chemicals. Another method of producing singlet delta oxygen has been the use of photosensitizers. For many applications this does not result in large enough quantities of singlet delta oxygen.

Thus there exists a need for a system and method producing high percentages of singlet delta oxygen that does not require large weight and volume devices and does not consume large quantities of explosive and toxic chemicals.

DETAILED DESCRIPTION OF THE DRAWINGS

A system for producing singlet delta oxygen has a source of liquid oxygen. A reactor has an input connected to the source of liquid oxygen. An optical pump is connected to an optical input of the reactor. The system can be by used as a laser by placing an optical resonator and a source of molecular iodine near the output of the reactor. The system produces high percentages of singlet delta oxygen and does not require large weight and volume devices and does not consume large quantities of explosive and toxic chemicals.

Figure 1:
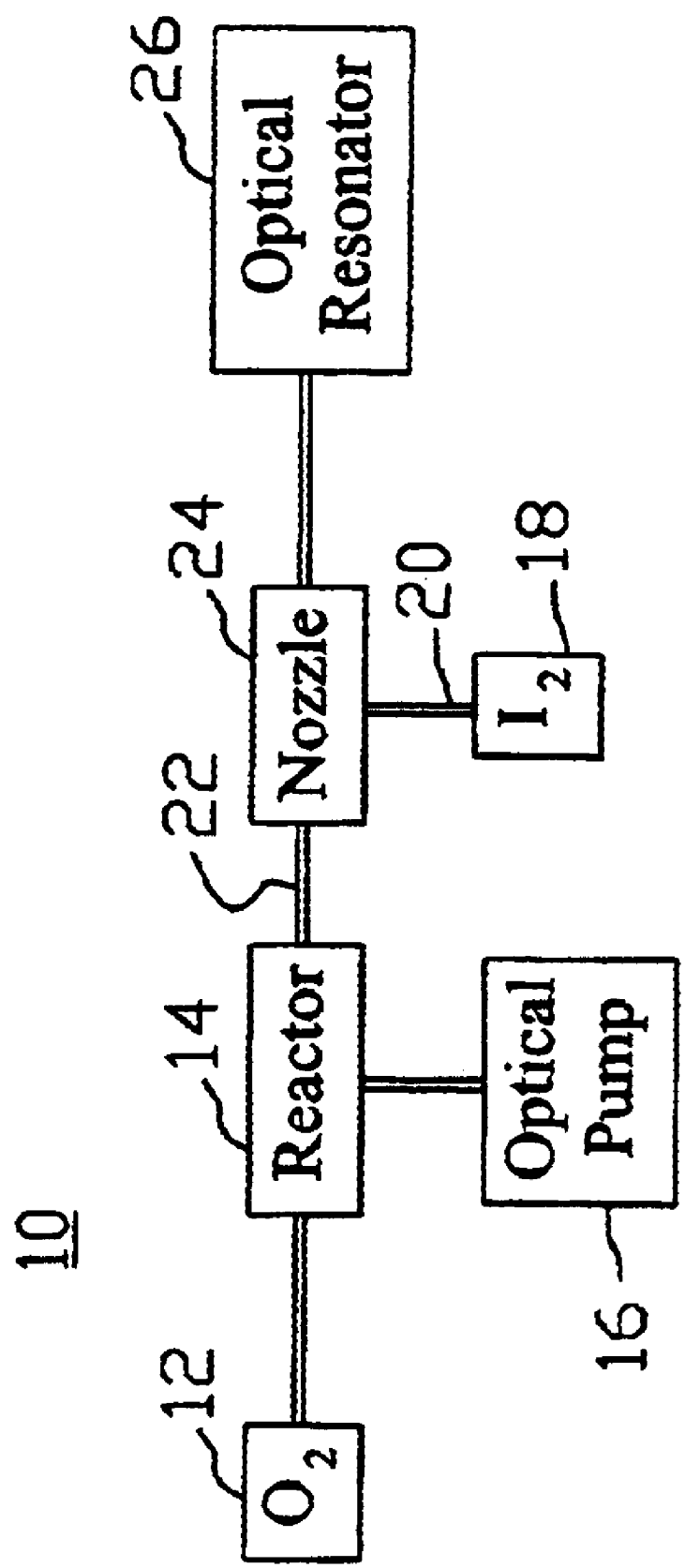
FIG. 1 is a block diagram of a system for producing singlet delta oxygen which may be used in a laser in accordance with one embodiment of the invention.

FIG. 1 is a block diagram of a system 10 for producing singlet delta oxygen which may be used in a laser in accordance with one embodiment of the invention. The system 10 has a source of oxygen 12. In one embodiment the source of oxygen is a liquid oxygen. In another embodiment, the source of oxygen is a high pressure oxygen. The source of oxygen 12 is connected to an input of a reactor (cyroreactor) 14. An optical pump source 16 is coupled to the reactor 14. A source of molecular iodine 18 has an output 20 adjacent to an output 22 of the reactor 14, in one embodiment used to produce a laser. The iodine 18 combines with the singlet delta oxygen in a nozzle 24. In one embodiment, an optical resonator cavity 26 is placed near the output of the nozzle 24 to form a laser. In one embodiment the optical pump source is a ytterbium doped fiber laser. In another embodiment the optical pump source is a group of laser diodes.

Figure 2:
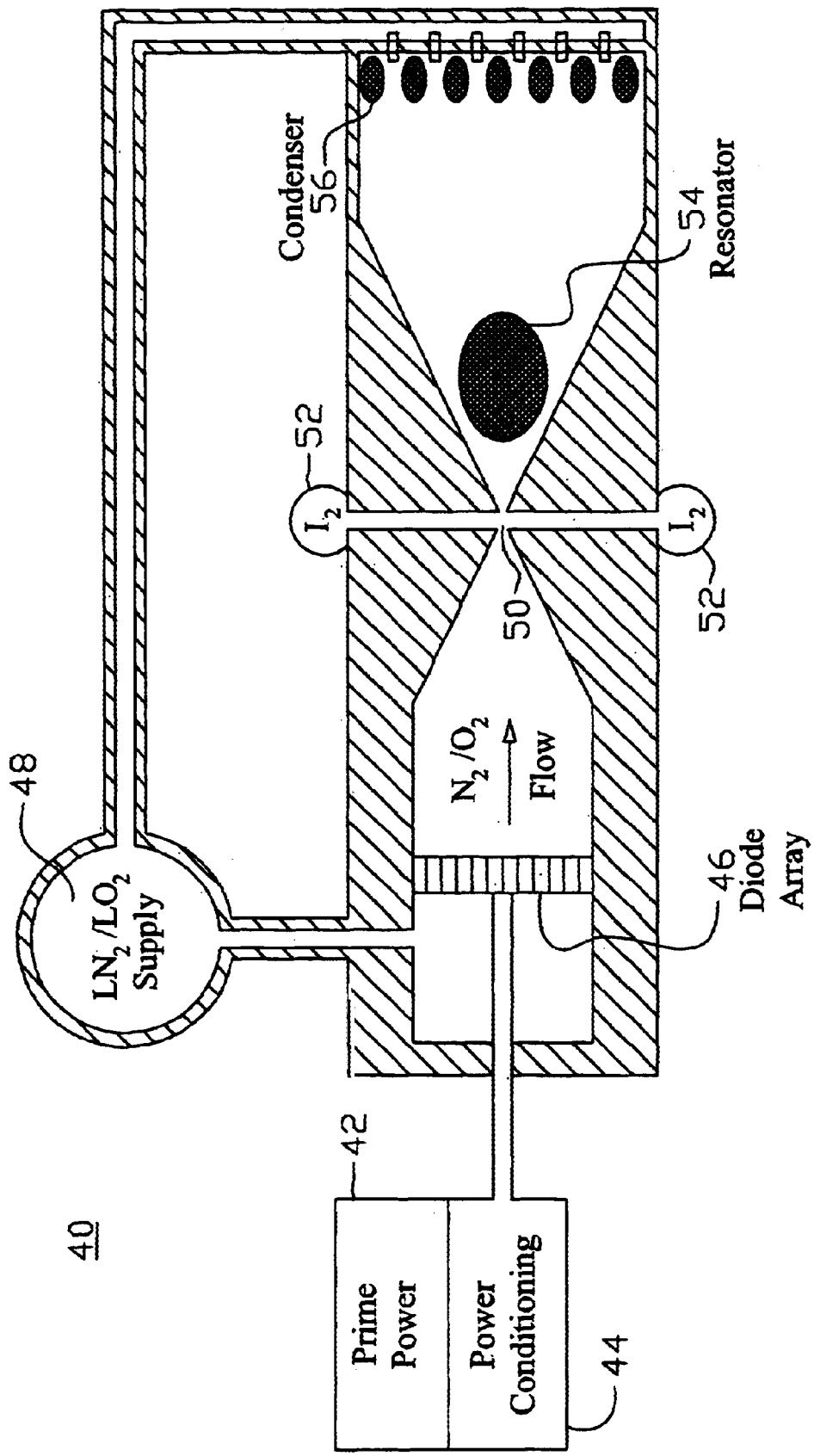
FIG. 2 is a block diagram of an optical oxygen iodine laser in accordance with one embodiment of the invention.

FIG. 2 is a block diagram of an optical oxygen iodine laser 40 in accordance with one embodiment of the invention. The laser 40 has a power source which includes a prime power source 42 and a power conditioning system 44. A diode array 46 is the optical excitation source. The diode array 46 produces a broadband emission around 634 nm in one embodiment. The diodes are cooled and temperature controlled by a combined flow of liquid nitrogen and liquid oxygen 48. The light source illuminates the liquid nitrogen and oxygen and produces a high percentage of singlet delta oxygen by the process

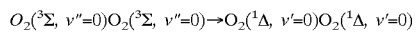

$$O_2(^3\Sigma,\ v''=0)O_2(^3\Sigma,\ v''=0) \rightarrow O_2(^1\Delta,\ v'=0)O_2(^1\Delta,\ v'=0)$$

Heat released from the reaction along with heat from the diode array provides the necessary heat to convert the liquid to a gas. The gas phase $O_2(^1\Delta)$ is allowed to expand into a volume sized to achieve an operating pressure of several atmospheres. This high pressure is used to drive a supersonic expansion through the nozzle 50. Molecular iodine 52 is mixed with the excited oxygen at the nozzle 50. The molecular iodine dissociates in the presence of the oxygen by collisions with the singlet sigma or singlet delta oxygen. A population inversion is obtained by the iodine atom collisions with the singlet delta oxygen and the resulting energy transfer reactions. An optical resonator 54 is placed across the output of the nozzle 50 and extracts optical energy from the gas flow by stimulated emission. A condenser 56 is used to collect the oxygen and nitrogen for reuse. In one embodiment, the light source is a Nd:YAG laser operating at 1060 nm or a ytterbium doped fiber laser.

Figure 3:
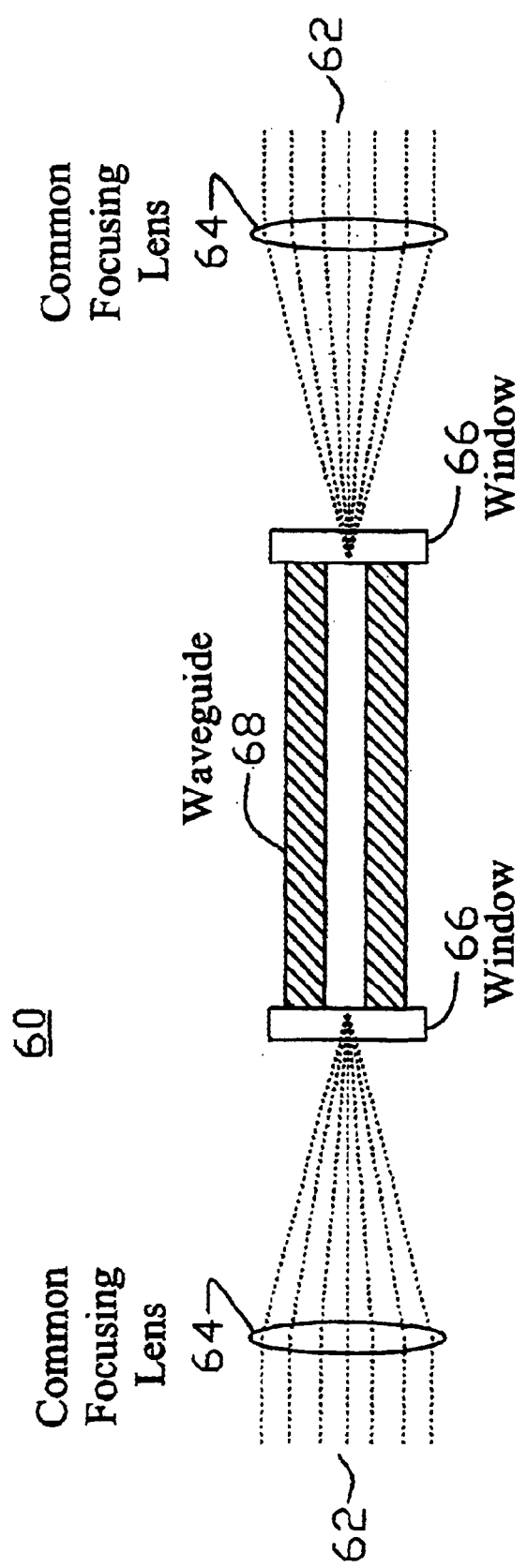
FIG. 3 is a an optical pumping system for a system for producing singlet delta oxygen in accordance with one embodiment of the invention.

FIG. 3 is a an optical pumping system 60 for a system for producing singlet delta oxygen in accordance with one embodiment of the invention. The system contains a plurality of Yb doped fiber lasers 62. The output of the plurality of fiber lasers 62 are focused by a pair of lenses 64 on a pair of windows 66. The windows 66 cover a waveguide structure 68. The waveguide structure is show in more detail in FIG. 4.

Figure 4:
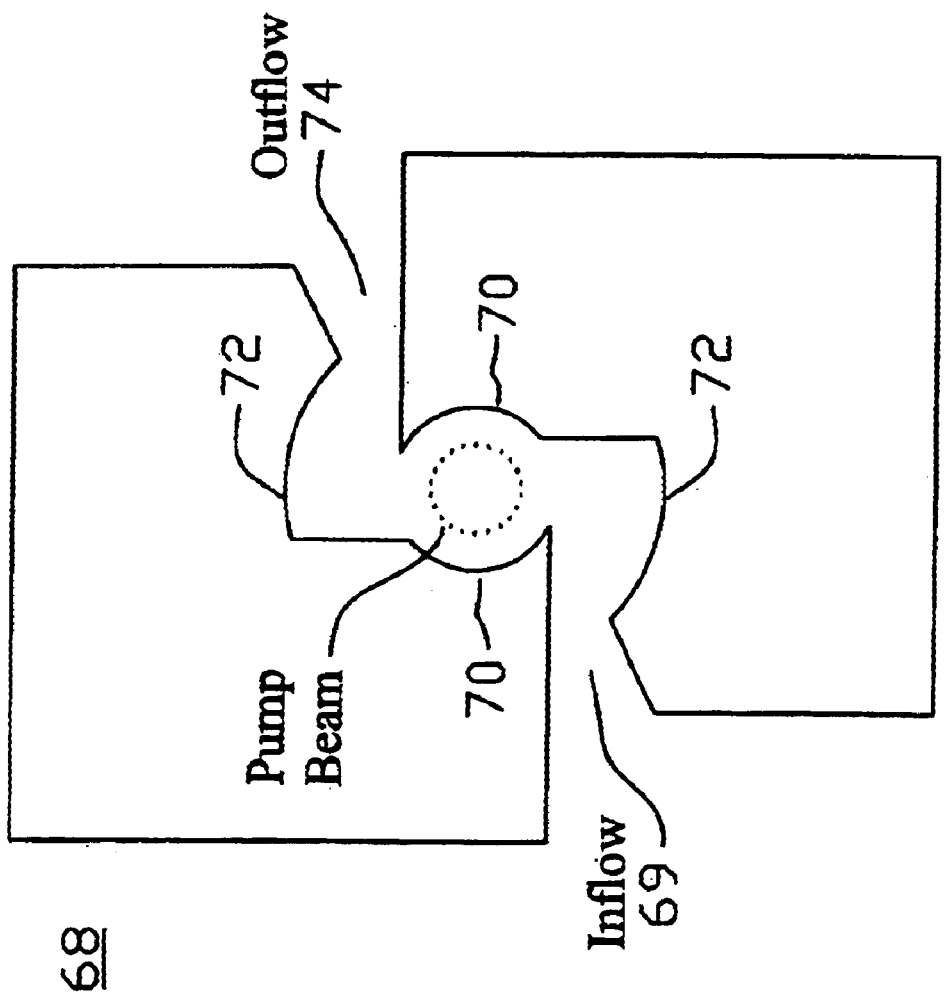
FIG. 4 is a cross section of a reactor for use in a system for producing singlet delta oxygen in accordance with one embodiment of the invention.

FIG. 4 is a cross section of a reactor 68 for use in a system for producing singlet delta oxygen in accordance with one embodiment of the invention. The liquid oxygen (high pressure oxygen) enters the reactor (cyroreactor, waveguide) 68 at an input 69. The structure of the reactor 68 has essentially two reflective cavities (pair of concentric mirrors and second pair of concentric mirrors) to confine the pump light in a horizontal and vertical direction. The interior structure of the reactor 68 is coated with a dielectric material to reflect the pump light. The pair of concentric mirrors 70 is concentric and confocal with the second pair of concentric mirrors 72. The reactor 68 has an output 74 in which the excited high pressure oxygen excites the reactor 68.

Figure 5:
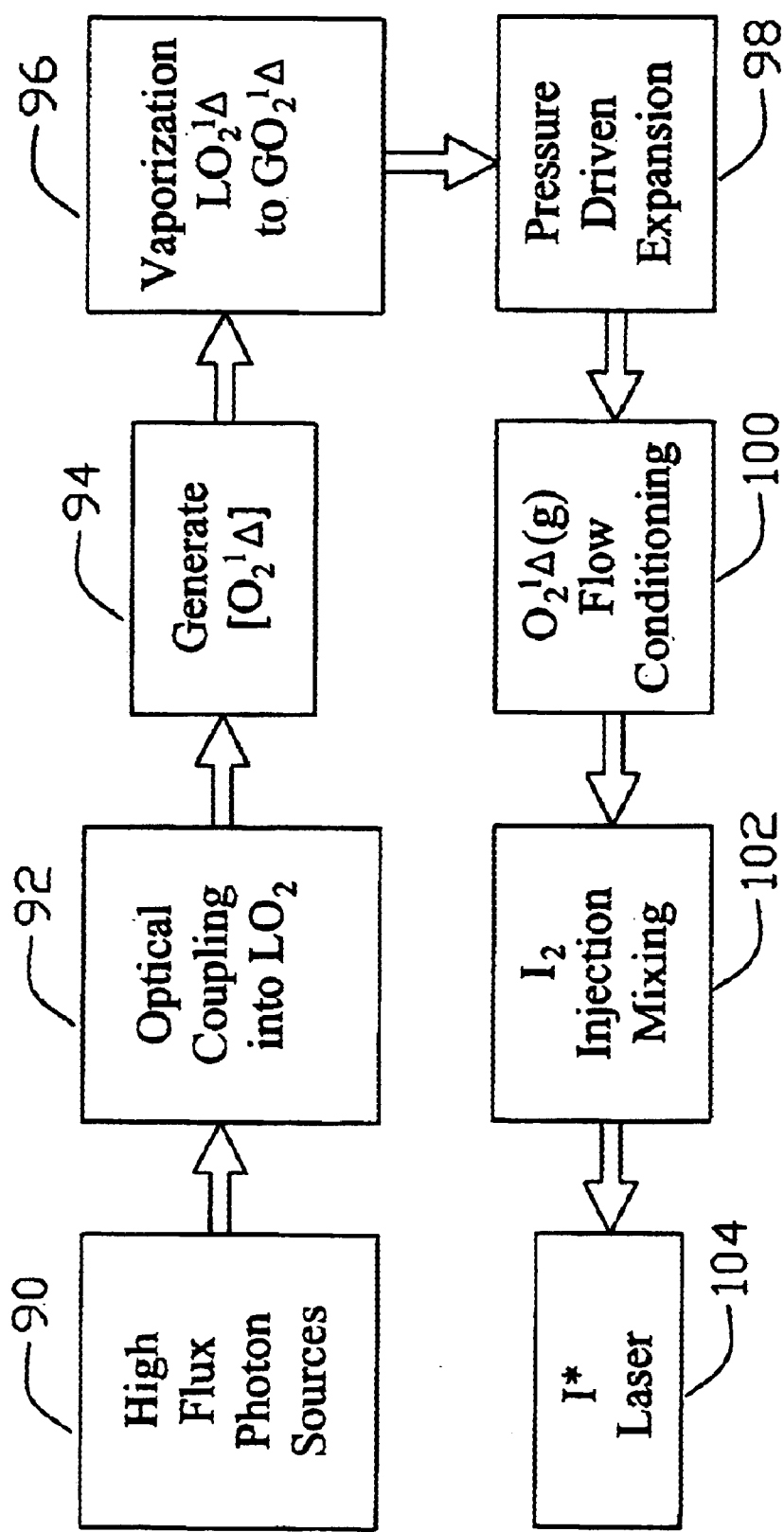
FIG. 5 is a flow chart of a system for producing singlet delta oxygen which may be used to in a laser in accordance with one embodiment of the invention.

FIG. 5 is a flow chart of a system for producing singlet delta oxygen which may be used to in a laser in accordance with one embodiment of the invention. The process starts, by generating a high flux of pump photons at step 90. The pump photons are optically coupled to the liquid oxygen in the reactor at step 92. In one embodiment the liquid oxygen is cross-flowed pumped at 1 m/s absorbing the pump light and producing liquid phase singlet delta oxygen (excited state oxygen) at step 94. Sufficient heat is produced by the excitation of the liquid oxygen to vaporize the oxygen by the time it exits the reactor at step 96. The vaporization results in a pressure driven expansion (pressurizing) at step 98. In one embodiment, the pressurized oxygen in flow conditioned by a nozzle at step 100 to form a low pressure stream of excited state oxygen. Molecular iodine is mixed at the output of the nozzle at step 102. The excited dissociated iodine then lases in optical cavity at step 104. Steps 102 and 104 are unnecessary to producing the singlet delta oxygen and are only used if a optical oxygen iodine laser is desired. Thus there has been described a system for producing high percentages of singlet delta oxygen relative to ground state oxygen that does not require large weight and volume devices and does not consume large quantities of explosive and toxic chemicals. One application for this high percentage of singlet delta oxygen is to produce a optical oxygen iodine laser which has also been described.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An optical oxygen iodine laser, comprising:
   a source of oxygen;
   a cryoreactor having an input connected to the source of oxygen;
   an optical pump source coupled to the cryoreactor, the cryoreactor concentrating light from said optical pump source to form an excited state of oxygen;
   a source of molecular iodine having an output adjacent to an output of the cryoreactor and mixing with the excited state of oxygen to dissociate the molecular iodine into an optical resonator cavity near the output of the cryoreactor, such that the optical resonator produces a laser output.

2. The laser of claim 1, wherein the optical pump source is a ytterbium doped fiber laser.

3. The laser of claim 1, wherein the optical pump source is a group of laser diodes.

4. The laser of claim 1, wherein the cryoreactor has an optical input at a longitudinal end.

5. The laser of claim 1, wherein the cryoreactor has a cross section that forms a pair of concentric mirrors.

6. The laser of claim 5, wherein the cross section of the cyroreactor forms a second pair of concentric mirrors that are concentric with the first pair of concentric mirrors.

7. The laser of claim 1, wherein the source of oxygen is a liquid oxygen.

8. The laser of claim 1, wherein the source of oxygen is a high pressure oxygen.

9. The laser of claim 1, wherein the output of the molecular iodine is in a nozzle.

10. A method of operating an optical oxygen iodine laser, comprising the steps of:
    pumping oxygen into a reactor;
    illuminating the oxygen in the reactor with an optical pump to form an excited state oxygen;
    pressurizing the excited state oxygen;
    forcing the excited state oxygen through a nozzle to form a low pressure stream of excited oxygen;
    adding molecular iodine to the low pressure stream of excited oxygen; and
    providing an optical resonator cavity at an output of the nozzle, the optical resonator having a laser output.

11. The method of claim 10, wherein the step of pumping includes pumping a liquid oxygen.

12. The method of claim 10, wherein the step of pressurizing includes vaporizing a liquid oxygen.

13. The method of claim 10, wherein the step of illuminating the oxygen includes the step of illuminating the oxygen with a plurality of laser diodes.

14. The method of claim 13, wherein the step of illuminating the oxygen with the plurality of laser diodes includes the step of bathing the plurality of laser diodes in a liquid oxygen.

15. A system for producing singlet delta oxygen, comprising:
    a source of liquid oxygen;
    a reactor having an input connected to the Source of liquid oxygen, the reactor concentrating an optical pump light on a liquid oxygen in from a singlet delta oxygen; and
    an optical pump connected to an optical input of the reactor.

16. The system of claim 15, further including a source of iodine having an output near an output the reactor.

17. The system of claim 16, further including:
    an optical resonator cavity near the output of the reactor.

18. The system of claim 17, wherein the optical pump is a ytterbium doped fiber laser.

19. The system of claim 15, wherein the reactor has a cross section that forms a pair of concentric mirrors.

20. The system of claim 19, wherein the cross section of the reactor forms a second pair of concentric mirrors that are concentric with the first pair of concentric mirrors components.

* * * * *